(12) United States Patent
Mack

(10) Patent No.: US 7,845,650 B2
(45) Date of Patent: Dec. 7, 2010

(54) DRILL CHUCK

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 1016 days.

(21) Appl. No.: 11/603,268

(22) Filed: Nov. 21, 2006

(65) Prior Publication Data

US 2007/0152407 A1 Jul. 5, 2007

(30) Foreign Application Priority Data

Dec. 7, 2005 (DE) .................. 10 2005 058 657

(51) Int. Cl.
*B23B 31/16* (2006.01)
(52) U.S. Cl. .................. 279/60; 279/152; 279/902
(58) Field of Classification Search ............ 279/60–65, 279/123, 152, 153, 902; B23B 31/16
See application file for complete search history.

(56) References Cited

U.S. PATENT DOCUMENTS

| | | | | |
|---|---|---|---|---|
| 4,302,021 A | * | 11/1981 | Rohm | 279/60 |
| 4,536,109 A | * | 8/1985 | Hunger et al. | 408/240 |
| 4,695,066 A | * | 9/1987 | Rohm | 279/62 |
| 4,700,956 A | * | 10/1987 | Rohm | 279/19.4 |
| 4,773,657 A | * | 9/1988 | Rohm | 279/19.1 |
| 4,844,482 A | * | 7/1989 | Rohm | 279/19 |
| 5,580,197 A | * | 12/1996 | Rohm | 408/240 |
| 5,765,839 A | * | 6/1998 | Rohm | 279/62 |
| 5,829,761 A | * | 11/1998 | Rohm | 279/62 |
| 6,095,530 A | * | 8/2000 | Rohm | 279/62 |
| 6,427,555 B2 | * | 8/2002 | Mack | 76/101.1 |
| 6,517,088 B1 | * | 2/2003 | Rohm | 279/62 |
| 6,536,782 B2 | * | 3/2003 | Rohm | 279/62 |
| 6,550,785 B2 | * | 4/2003 | Rohm | 279/62 |
| 6,581,942 B2 | * | 6/2003 | Rohm | 279/62 |
| 6,648,341 B1 | * | 11/2003 | Gaddis et al. | 279/60 |
| 6,883,808 B2 | * | 4/2005 | Rohm et al. | 279/60 |
| 6,883,809 B2 | * | 4/2005 | Rohm | 279/62 |
| 6,959,931 B2 | * | 11/2005 | Sakamaki et al. | 279/62 |
| 7,178,216 B2 | * | 2/2007 | Sakamaki et al. | 29/436 |
| 7,389,993 B2 | * | 6/2008 | Rohm et al. | 279/62 |
| 7,431,308 B2 | * | 10/2008 | Cachod | 279/62 |
| D580,727 S | * | 11/2008 | Mack | D8/70 |
| 2002/0053773 A1 | * | 5/2002 | Rohm | 279/62 |
| 2003/0066390 A1 | * | 4/2003 | Mack | 76/101.1 |
| 2003/0077136 A1 | * | 4/2003 | Rohm | 408/239 R |
| 2005/0127618 A1 | * | 6/2005 | Baumann | 279/60 |
| 2006/0202435 A1 | * | 9/2006 | Rohm et al. | 279/62 |

* cited by examiner

*Primary Examiner*—Eric A Gates
(74) *Attorney, Agent, or Firm*—Andrew Wilford

(57) ABSTRACT

A drill chuck has a body formed with a forwardly open threaded bore and a holder sleeve rotatable on the body and formed with a plurality of forwardly open angled guides angularly equispaced about the axis. Respective jaws are shiftable radially along the guides between a widely spaced outer position and a closely spaced inner position. Each jaw has a central tool-engaging tooth and a pair of faces flanking the respective tooth, and each tooth and the adjacent flanking faces are so dimensioned and oriented relative to each other that in the inner position the flanking faces of adjacent jaws bear on one another. A pusher threaded into the bore bears axially forward on the jaws and is angularly coupled to the jaws and holder sleeve so that relative rotation or the chuck body and pusher moves the jaws between their inner and outer positions.

6 Claims, 4 Drawing Sheets

DRILL CHUCK

FIELD OF THE INVENTION

The present invention relates to a chuck. More particularly this invention concerns such a chuck for a power drill.

BACKGROUND OF THE INVENTION

A standard self-tightening drill chuck has a chuck body centered on and rotatable about an axis and formed with a forwardly open threaded bore and a holder sleeve rotatable about the axis on the body but axially generally nondisplaceable relative thereto and formed with a plurality of forwardly open angled guides angularly equispaced about the axis. Respective jaws are shiftable radially along the guides between inner and outer positions. A pusher threaded into the bore bears axially forward on the jaws and is angularly coupled to the jaws and holder sleeve so that relative rotation or the chuck body and pusher moves the jaws between their inner and outer positions.

A significant factor for the quality of a drill chuck consists in the amount of the clamping force that can be applied by the chuck to the tool or workpiece it holds in order to allow the transmission of high torque during drilling and to ensure safe clamping of the drilling tool between the inner edges of the jaws for the whole service life of the drill chuck, so that even if the drilling tool is frequently changed the jaws, whose inner edges are especially exposed to damage and preferably have a tapered profile, may become blunt if the clamping edges are deformed to the side. This may be caused involuntarily by the user when the tool diameters is very small or even when no drilling tool is present and the drill chuck is completely closed, for example by means of the power unit of the drill.

This is a particular problem when the inner edges of the jaws are formed with teeth intended to engage the tool in line or even point contact, since such teeth can bear on each other, in particular in a situation when the chuck is spun closed with no tool in it, with sufficient force to damage each other. The problem is particularly critical in systems where each jaw has a hard metal, e.g. cermet or carbide, insert that forms the tool-engaging teeth on the inner chuck face.

OBJECTS OF THE INVENTION

It is therefore an object of the present invention to provide an improved drill chuck.

Another object is the provision of such an improved drill chuck that overcomes the above-given disadvantages, in particular that prevents damage to the critical inner edges of the jaws.

SUMMARY OF THE INVENTION

A drill chuck has according to the invention a chuck body centered on and rotatable about an axis and formed with a forwardly open threaded bore and a holder sleeve rotatable about the axis on the body but axially generally nondisplaceable relative thereto and formed with a plurality of forwardly open angled guides angularly equispaced about the axis. Respective jaws are shiftable radially along the guides between an outer position in which the jaws are relatively widely spaced radially from each other and an inner position in which the jaws are closely radially spaced. In accordance with the invention each jaw has a central tool-engaging tooth and a pair of faces flanking the respective tooth, and each tooth and the adjacent flanking faces are so dimensioned and oriented relative to each other that in the inner position the flanking faces of adjacent jaws bear on one another. A pusher threaded into the bore bears axially forward on the jaws and is angularly coupled to the jaws and holder sleeve so that relative rotation or the chuck body and pusher moves the jaws between their inner and outer positions.

According to the invention each tooth and the adjacent flanking faces are so dimensioned and oriented relative to each other that in the inner position the flanking faces of adjacent jaws bear in surface contact on one another and the teeth are radially spaced outward from the axis and do not contact one another. Thus extremely hard or brittle teeth cannot damage one another.

Thanks to this construction, when the drill chuck is completely closed the clamping blades do not directly act on each other, which is important if this procedure is unintended by the user, even if no drilling tool is between the jaws. This may cause problems, particularly if the motor in the drilling machine associated to the drill chuck is used to adjust the jaws, as the movement of the jaws in the right direction is only determined by the switch, which is either in the position for forward or reverse rotation. Thus, it is easily possible to cause the closing process of the drill chuck instead of the intended opening process, which in case of the drill chuck according to the invention results only in a contact of the bearing surfaces without the sharp teeth being damaged.

Within the framework of the invention it is most especially preferred if the teeth are formed on inserts placed in longitudinal grooves or seats of the jaw body and if the bearing surfaces are formed by the front side of the jaw body. Here the jaws for the drill chuck according to the invention, which are generally designed as flat jaws, consist of a cost-efficient material which can be easily processed while the desired high clamping strength is provided by the optimized clamping inserts. It is advantageous if the clamping inserts consist of a hard metal or of a metal with a hardened surface in order to thus avoid wear of the inserts and to actual biting into the shank of the drilling tool for clamping it.

It has been further found to be advantageous if at least one of the jaws in the clamping blade is formed with at least one transverse slot or groove, that is lying in a plane perpendicular to the chuck axis. Due to reduced contact surface of the teeth this groove, on the one hand, causes an increased line contact and, on the other hand, it is possible to provide a sharp cutting tooth at the side of the edge groove to actively engage the shank of the drilling tool and thus provide a positive grip.

It is also possible to provide a plurality of clamping inserts set at an axial spacing from each other and having sharp ridges or edges forming the teeth on the sides turned radially inward, that is toward each other, so that the above-described advantages can also be achieved if clamping inserts made of hard metal are used to gain the advantages connected therewith.

Within the framework of the invention it is furthermore advantageous if the clamping edges of each jaw are provided with two or more teeth that, in spite of reducing the force of the line contact compared to an embodiment where only one tooth used, still guarantee a safe and permanent connection if the drilling tools have different shank diameters, particularly if due to the generated torque moments the inward force of applied by the teeth is created by a self-tightening action. Thus, it is possible to arrange the two clamping teeth in staggered positions or to set the two clamping bezels shifted to the side of the center of the clamping blade in their longitudinal orientation.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
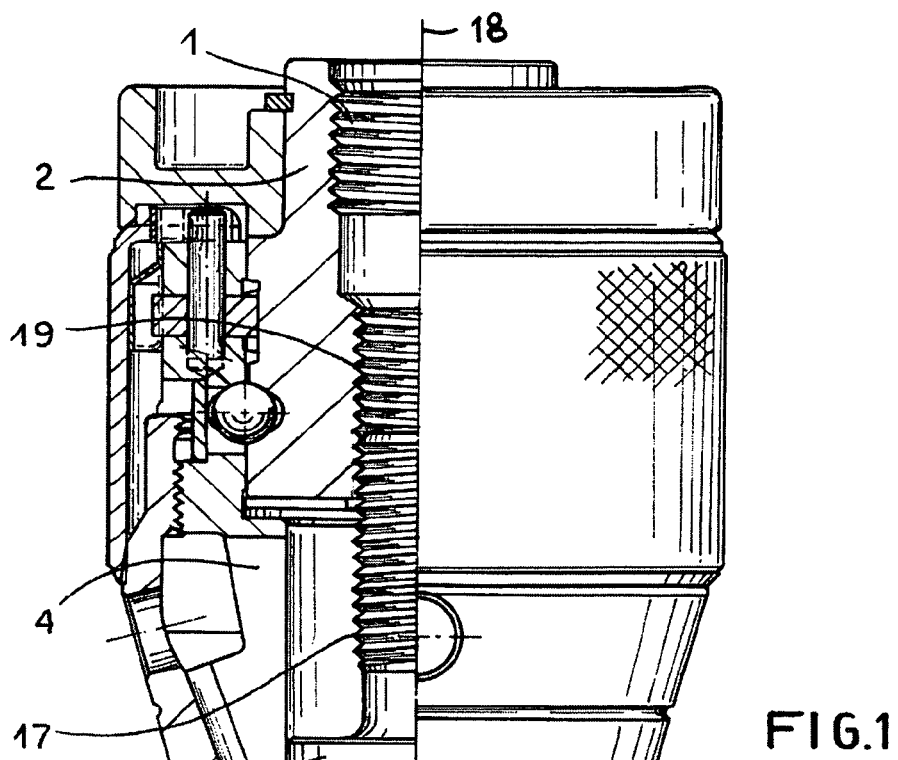
FIG. 1 is a side view partly in axial section through a first drill chuck according to the invention.

The various embodiments of the invention all share a basically common chuck structure. They all have a steel chuck body 2 centered on an axis 18 and having an axially throughgoing passage with a rearwardly open threaded portion 1 adapted to be screwed onto the drive spindle of a power unit and a coaxial forwardly open threaded portion 19. A jaw holder 4 can rotate about the axis 18 on the body 2 but not move axially thereon. It carries a tightening sleeve 3 and forms with the sleeve 3 three angularly equispaced and inwardly open T-section guide slots 8 each in turn holding a jaw generally shown at 5. A pusher 9 has a front end fitted with the three jaws 5 and angularly coupled to them and through them to the sleeve 4 and holder 3, and a rear end provided with a screwthread 17 fitting in the front portion 19. Thus as is standard, joint rotation of the sleeve 3, holder 4, jaws 5, and pusher 8 relative to the body 2 will screw the holder 8 axially forward to move the jaws 5 along the angled floors of the guides 8 from a rear (up in FIG. 1) spread position to a front closed position, and opposite relative rotation will oppositely shift the jaws 8. The pitches of the screwthreads between the chuck body 2 and pusher 9 are such that this chuck is self-tightening, that is during normal use the torque applied by a bit held by the jaws 5 will be effective to rotate the subassembly formed by the sleeve 3, holder 4, and jaws 5 in a direction tightening the jaws 5 on the bit. This is all generally standard.

Figure 2:
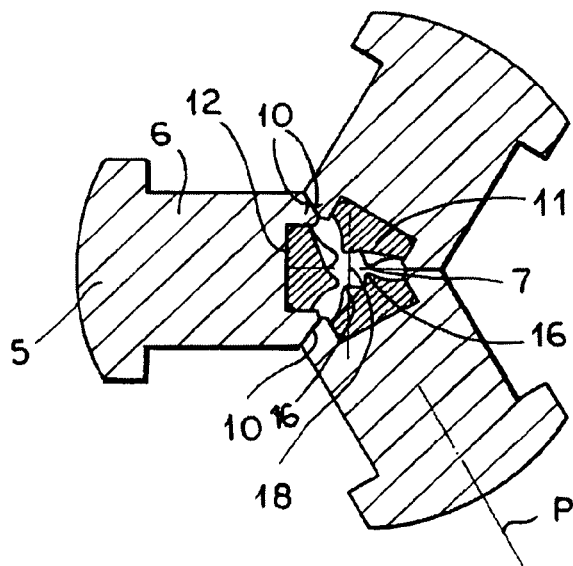
FIG. 2 is a section taken along line II-II of FIG. 1.

FIG. 2 shows how the jaw 5 each have a basically T-section body 2 that is complementary to the respective guide groove 8, and a front edge formed with a groove seat 12 holding a hard-metal insert 11 having a pair of ridges or teeth 7. To both sides of the insert 11, each body 6 has a pair of planar faces that extend at an angle of 120° to each other. According to the invention the inserts 11 are set such that as shown in FIG. 2 when the jaws 5 are advanced all the way forward to their closest possible positions, the faces 10 of adjacent jaws 5 flatly abut each other while the teeth 7 remain at a slight spacing from each other and do not touch. Thus accidentally breaking or chipping these teeth 7 by excessive tightening of the chuck when it is not holding a tool is impossible. Here there are in fact two such inserts 11 on each jaw 5, and each insert has a two axially offset teeth 7 staggered symmetrically to opposite sides of a central jaw symmetry plane P including the axis 18.

Figure 3:
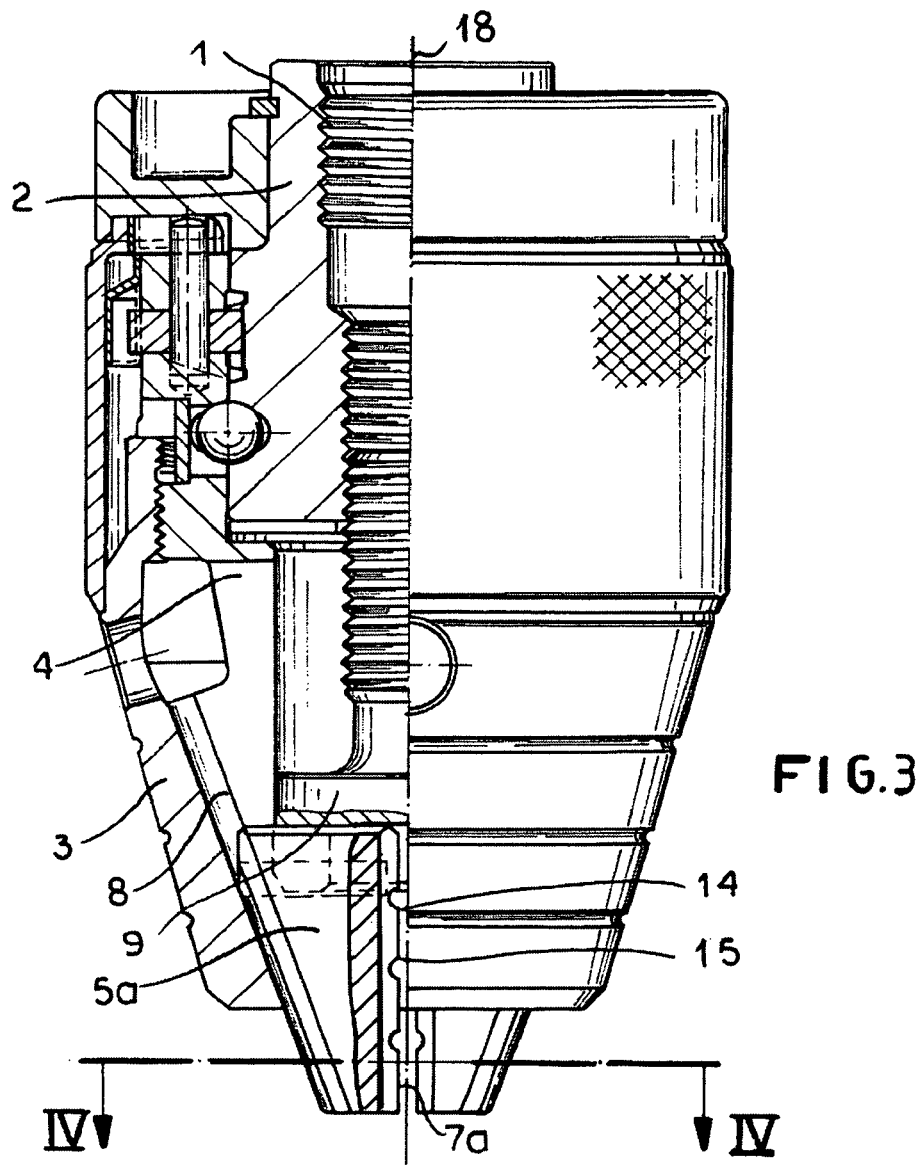
FIG. 3 is a side view partly in axial section through a second drill chuck according to the invention.
Figure 4A:
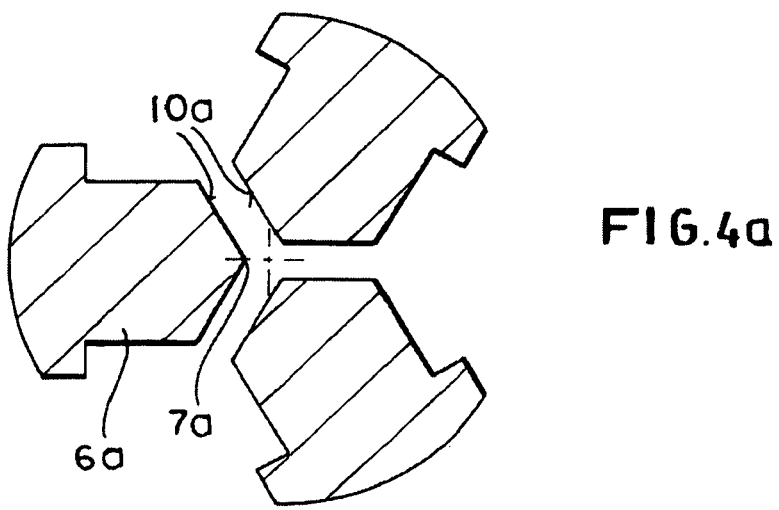
FIG. 4a is a section taken along line IV-IV of FIG. 3.

FIGS. 3 and 4a show an embodiment in which the clamping blade 6a of the jaws 5a is provided with three transverse grooves 14 subdividing each tooth ridge 7a into four parts. Each such groove 14 forms two sharp end points 15 on the respective teeth 7a. Here the flanks 10a of each tooth also extend at angles of 120° to each other and form smooth continuations of the flanks of the respective teeth 7a.

Figure 4B:
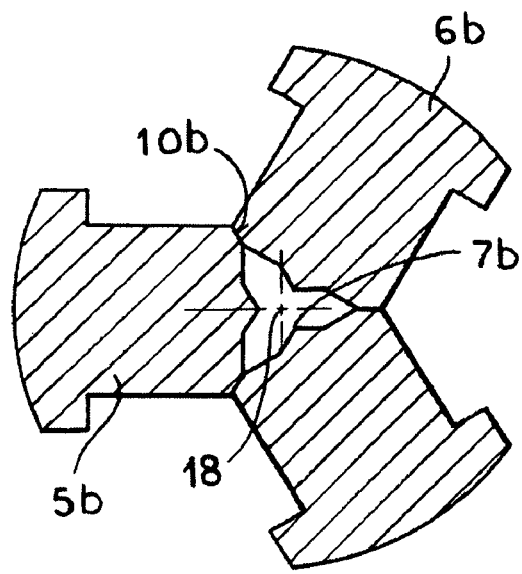
FIGS. 4b and 4c are views like FIG. 4a of alternative jaws.

In FIG. 4b the teeth 7b are recessed back on the bodies 6b of the respective teeth 5b. Thus in the innermost positions the flanks 10b engage flatly against each other but the innermost portions of the teeth 7b are spaced radially outward from the axis 18.

Figure 4C:
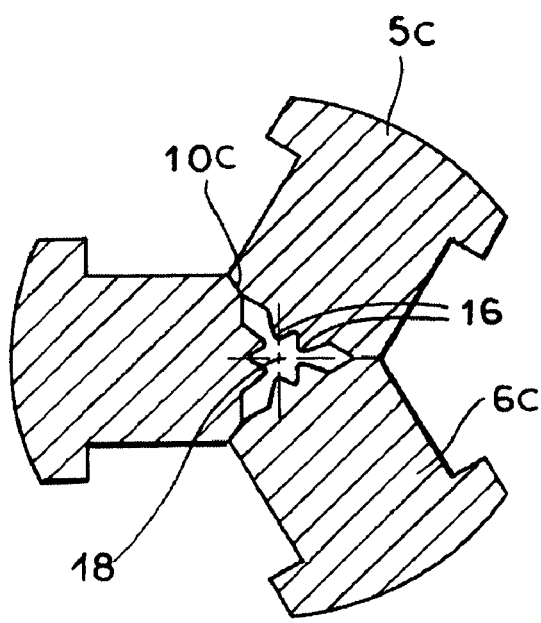

FIG. 4c shows another arrangement where jaws 5c have bodies 6c each formed with two teeth 16 symmetrically flanking the respective symmetry planes P, and also out of contact with each other in innermost position when flanks 10c bear flatly on each other.

Figure 5:
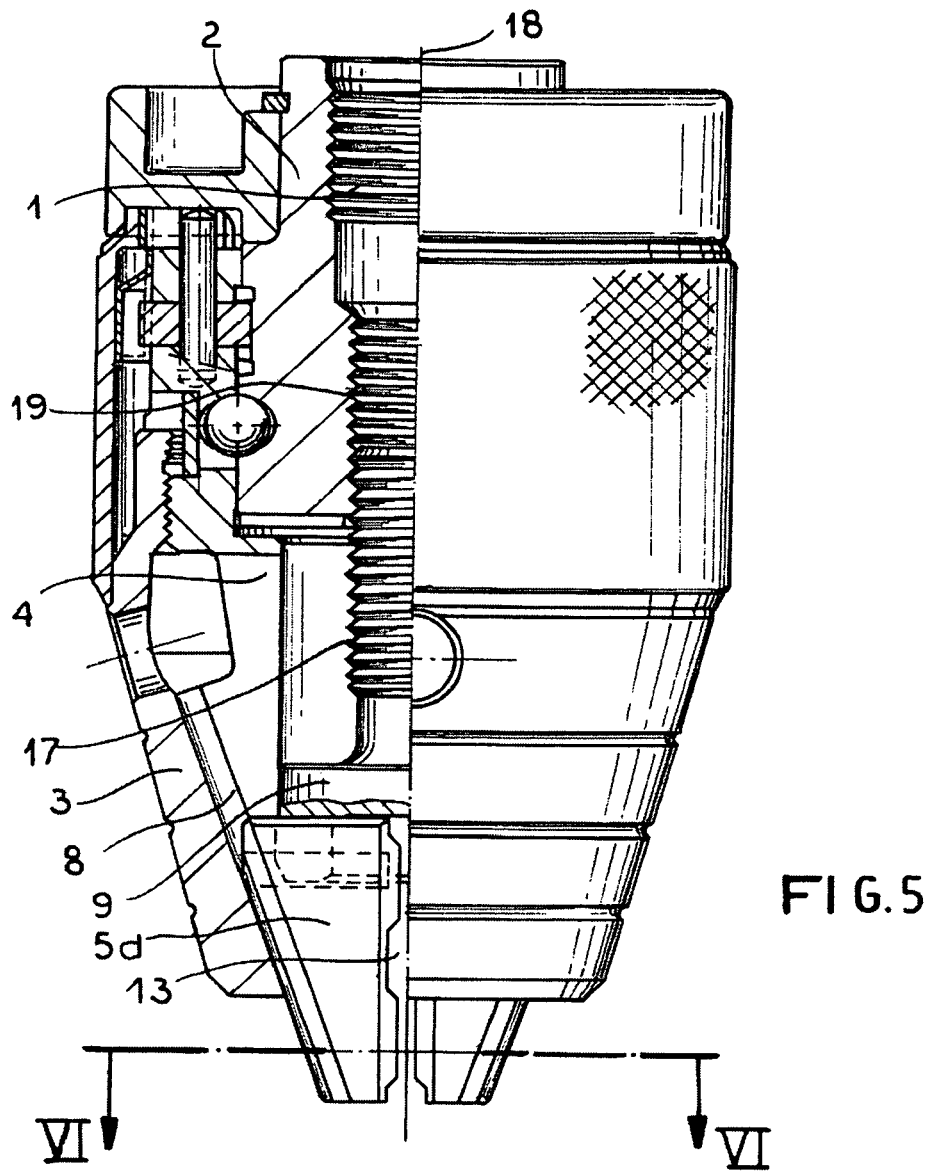
FIG. 5 is a side view partly in axial section through a third drill chuck according to the invention.
Figure 6:
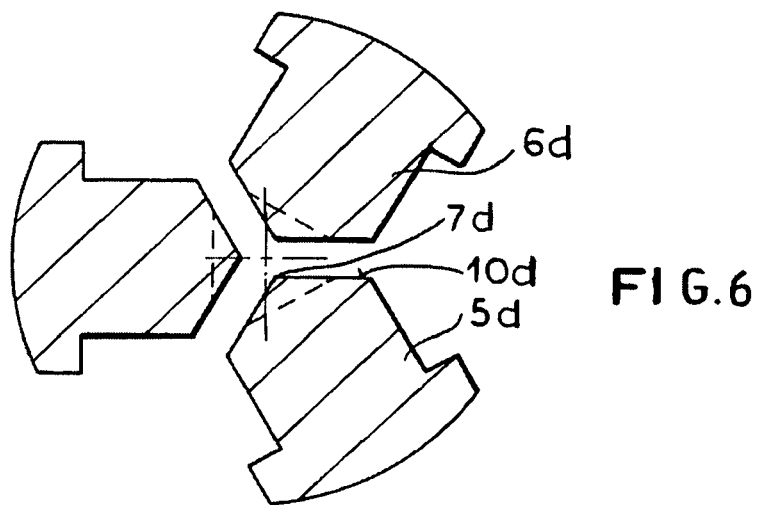
FIG. 6 is a section taken along line VI-VI of FIG. 5.

The system of FIGS. 5 and 6 is similar to that of FIGS. 3 and 4a except here the jaws 5d have bodies 6d each unitarily formed with teeth 7c having two parts separated by a transverse slot 13. Once again, in the closed position the flanking faces 10d bear flatly on each other.

I claim:

1. A drill chuck comprising:
  a chuck body centered on and rotatable about an axis and formed with a forwardly open threaded bore;
  a holder sleeve rotatable about the axis on the body but axially generally nondisplaceable relative thereto and formed with a plurality of forwardly open angled guides angularly equispaced about the axis;
  respective jaws shiftable radially along the guides between an outer position in which the jaws are relatively widely spaced radially from each other and an inner position in which the jaws are closely radially spaced, each jaw being comprised of
    a body formed with a central radially inwardly open seat and a pair of faces angularly flanking the respective seat and
    a hard-metal insert fitted in the seat and formed with a radially inwardly directed tooth,
  each tooth and the adjacent flanking faces being so dimensioned and oriented relative to each other that in the inner position the flanking faces of adjacent jaws bear in surface contact on one another and the inserts are out of contact with one another, each tooth being formed with a radially inwardly open transverse slot subdividing it into two axially spaced parts; and
    a pusher threaded into the bore, bearing axially forward on the jaws, and angularly coupled to the jaws and holder sleeve, whereby relative rotation of the chuck body and pusher moves the jaws between their inner and outer positions.

2. The drill chuck defined in claim 1 wherein each tooth has two such inserts spaced axially apart.

3. The drill chuck defined in claim 1 wherein each insert has two such teeth symmetrically flanking a symmetry plane of the respective jaw body, the symmetry planes including the chuck axis.

4. The drill chuck defined in claim 3 wherein the two teeth of each jaw are axially spaced from each other.

5. The drill chuck defined in claim 1 wherein the slots all lie in a common plane perpendicular to the axis.

6. The drill chuck defined in claim 1 wherein each tooth has at least two such slots spaced apart along the axis.

* * * * *